United States Patent Office 2,786,367
Patented Mar. 26, 1957

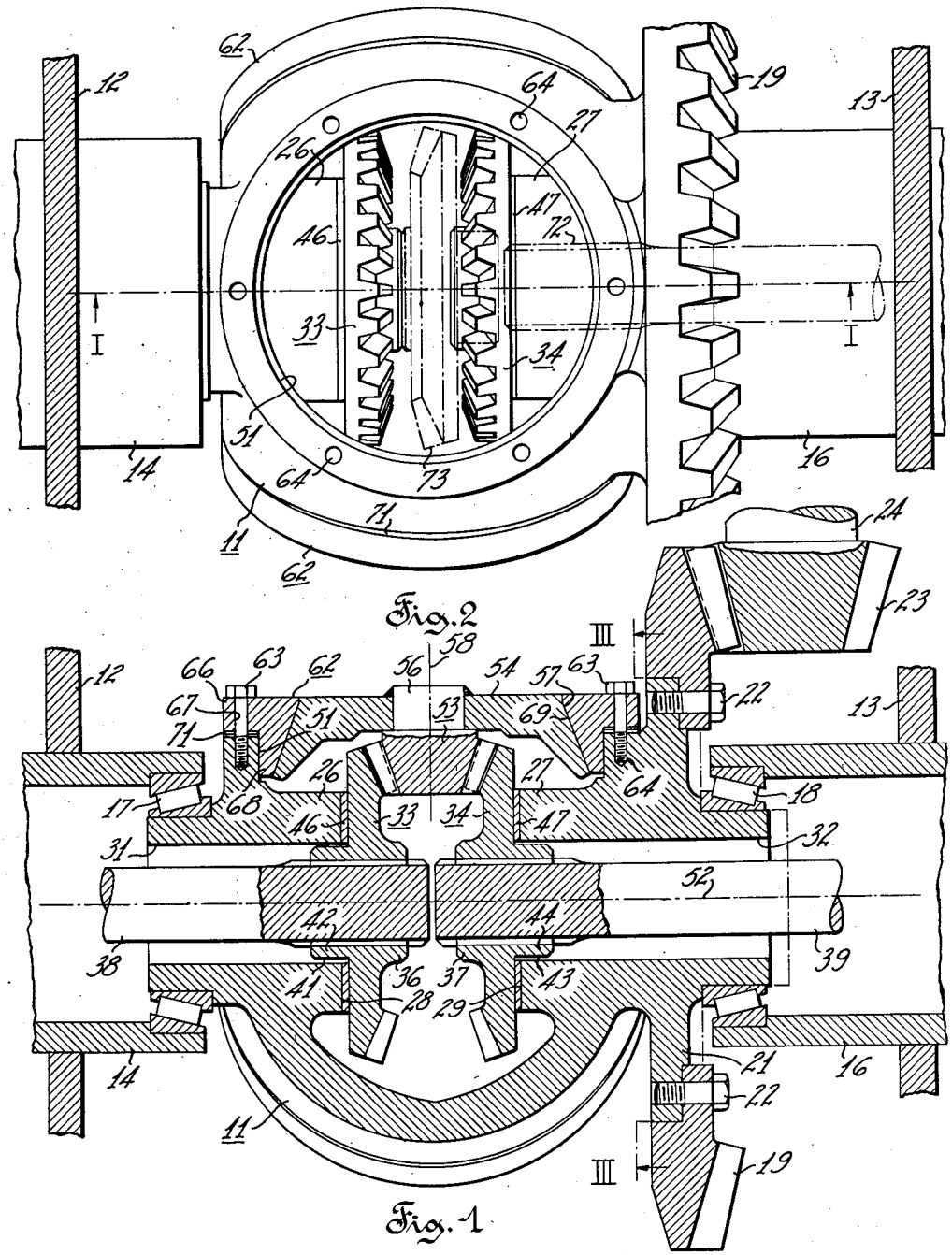

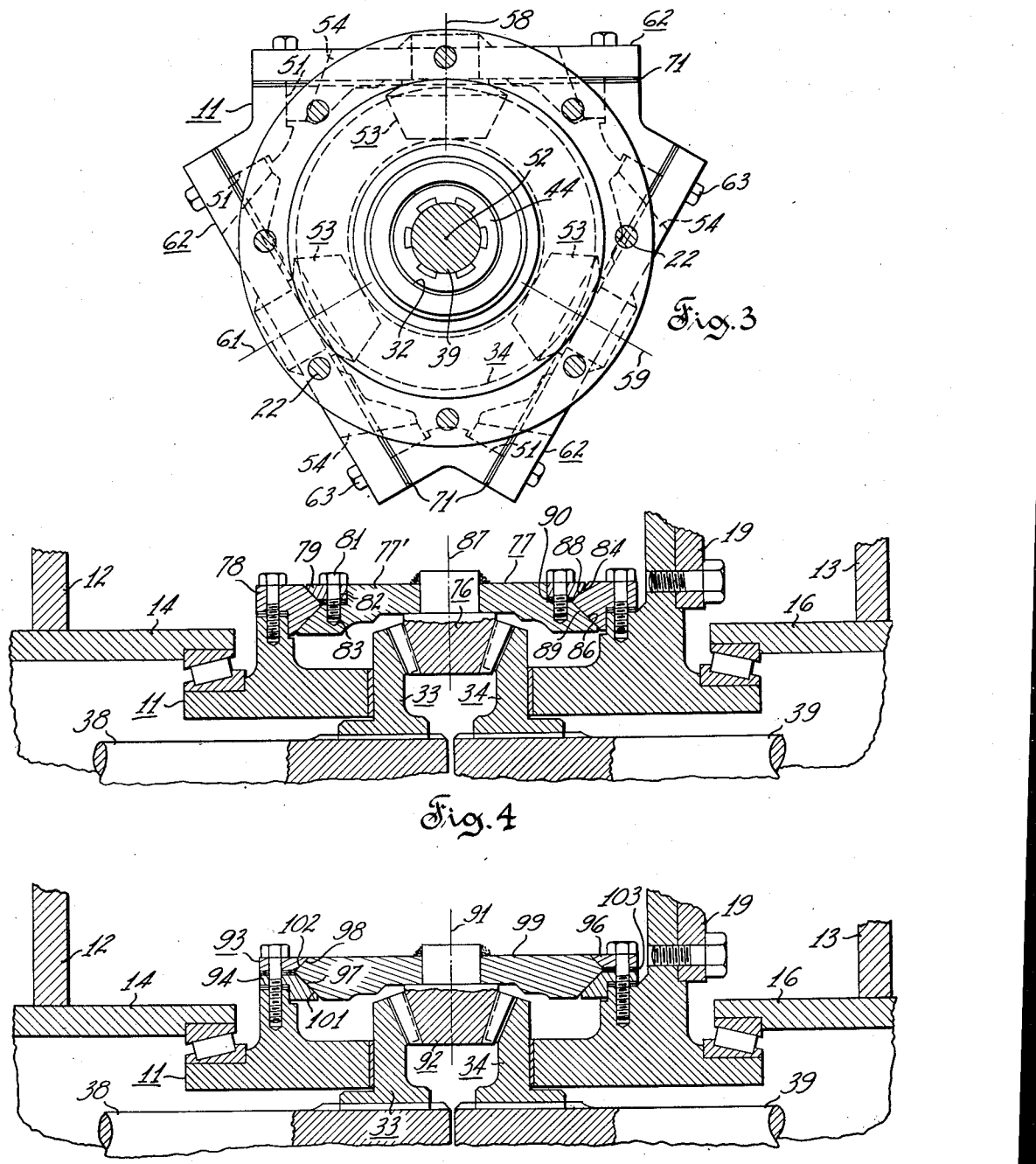

2,786,367

DIFFERENTIAL

Harvey W. Rockwell, Cedar Rapids, Iowa, assignor to Allis-Chalmers Manufacturing Company, Milwaukee, Wis.

Application September 28, 1954, Serial No. 458,789

12 Claims. (Cl. 74—713)

The invention relates to power transmitting gearing and it is concerned more particularly with a bevel gear differential, that is, a differential wherein a pair of bevel side gears and a set of planetary bevel pinions in mesh with the side gears are rotatably mounted within a rotary cage or housing structure.

Bevel gear differentials are widely used in motor vehicles and, generally, it is an object of the invention to provide an improved automotive type of bevel gear differential which permits removal of the side gears and planet pinions from the cage without the necessity of first removing the cage from its supporting structure, so that a substantial amount of time may be saved when component parts of the differential such as gears, bearings and thrust washers are to be inspected or replaced.

Although it is possible to remove the bevel side gears and bevel planet pinions from some prior art differentials without removing the differential cage from its support, these previously suggested differential mechanisms are not entirely satisfactory, particularly those which employ only two planet pinions. In a two pinion bevel gear differential it is difficult, for instance, to provide for even load distribution on the teeth of the pinions and side gears and to obtain satisfactory tooth life.

More specifically, it is an object of this invention to provide an improved bevel gear differential of the hereinbefore outlined character in which the planet pinions are rotatably mounted in registering relation, respectively, with peripheral apertures of the cage, and in which the peripheral cage apertures and the planet pinions are relatively proportioned so that the pinions may be moved into and out of the cage through their respective cage apertures.

It is a further object of this invention to provide an improved differential of the hereinbefore outlined character in which at least one of the peripheral cage apertures is large enough to accommodate movement of the side gears therethrough.

It is a further object of this invention to incorporate the hereinbefore outlined features of improvement in a bevel gear type torque proportioning differential.

It is a further object to provide an improved bevel gear differential which is relatively inexpensive to build and gives satisfactory service.

It is a further object of this invention to provide an improved torque proportioning differential which is easy to service and wherein the pinions and their bearings may be replaced without necessitating removal of the differential cage from its support.

It is a further object of this invention to provide an improved torque proportioning differential in which provision is made for adjustment to compensate for possible wear in the friction surfaces provided to resist differential action.

These and other objects and advantages of this invention will be evident from the following description when read in connection with the accompanying drawings, in which:

Fig. 1 is a sectional view taken on line I—I in Fig. 2, of a differential gear installation for motor vehicles;

Fig. 2 is a plan view of the installation shown in Fig. 1 with parts omitted for purposes of exposure;

Fig. 3 is an end view taken in section on line III—III of Fig. 1, the bevel ring gear at the right of Fig. 1 being omitted in Fig. 3;

Fig. 4 is a sectional view corresponding to the upper part of Fig. 1, and showing a modification of the mounting structure for the planet pinions; and Fig. 5 is a sectional view similar to Fig. 4 and showing a further modification of the planet pinion mounting structure.

Referring to Fig. 1, a differential cage 11 is rotatably supported on stationary walls 12 and 13 through supporting tubes 14 and 16 and tapered roller bearings 17 and 18. A bevel ring gear 19 is secured to a circular flange 21 formed on cage 11 by a plurality of cap screws 22 which are threaded into drilled and tapped holes in flange 21. The ring gear 19 is driven by a driving pinion 23 formed on the end of a power shaft 24 connected to a power source, not shown.

The cage 11 has a pair of inwardly extending hub portions 26 and 27 which present inwardly facing and radially extending thrust transmitting surfaces 28 and 29, respectively. Aligned bores 31 and 32 are formed in cage 11 and provide interior openings in hub portions 26 and 27, respectively. A pair of bevel side gears 33 and 34 are positioned within the interior of the cage 11 and have their hubs 36 and 37 connected in splined, driving relation, respectively, to a pair of differential half shafts 38 and 39. The shafts 38 and 39 may be connected to vehicle traction wheels, not shown. The splined connections between shafts 38 and 39 and their associated hubs 36 and 37 are axially loose so as to allow the shafts to be withdrawn from the side gears 33 and 34. Shaft 38 is withdrawable to the left and shaft 39 is withdrawable to the right as viewed in Fig. 1. A cylindrical surface 41 is formed on the portion 42 of hub 36 which extends into bore 31. The cylindrical surface 41 is in radially confronting relation to bore 31 and the diameter of portion 42 of hub 36 is slightly less than the diameter of bore 31 so that there is clearance between surface 41 and bore 31 allowing gear 33 to float in bore 31. A similar relation exists between a cylindrical surface 43 formed on a portion 44 of hub 37 of side gear 34 and bore 32 of the cage 11.

A thrust washer 46 surrounds hub portion 42 and is interposed between surface 28 of cage 11 and the back side of bevel gear 33. Thus the axially outward thrust of gear 33 is transmitted to hub 26 of cage 11 through thrust washer 46. Similarly, a thrust washer 47 surrounds hub portion 44 and is interposed between the back side of bevel gear 34 and surface 29 of cage hub 27.

When the side gears 33 and 34 are in their installed condition within the cage structure 11 as shown in Fig. 1, the distance between the axially innermost portions of their hubs 36 and 37 is greater than the distance which either hub portion 42 and 43 extends axially into bores 31 and 32, respectively.

Referring to Figs. 1, 2 and 3, three cylindrical surfaces define three peripheral apertures 51 which communicate with the interior of cage 11. These apertures are equally spaced circumferentially about the axis 52 of the side gears 33 and 34, this axis 52 also being the axis of shafts 38 and 39 and the axis of rotation of cage 11.

A bevel planet pinion 53 is positioned within each of the three apertures 51 and these pinions are in mesh with the two side gears. In Figs. 1, 2 and 3, the planet pinions 53 each have a frusto-conical head portion 54 secured, as by welding, to an outward extending stub portion 56. The frusto-conical head portions 54 each present a conical surface 57 which tapers radially outward, that is, toward an apex at the outside of cage 11. As shown in Fig. 3, the axes 58, 59 and 61 of pinions 53 radiate at right angles from axis 52 and like the axes of the conical surfaces 57 are spaced 120 degrees apart so as to coincide with the latter.

Three annular retainers 62 are releasably secured to cage 11 by cap screws 63 which are threaded into tapped holes 64 in underlying annular portions of the cage 11. As shown in Fig. 1, each retainer 62 has a circular flange 66 extending radially relative to the axis of the associated aperture 51, the retainer 62 having drilled holes 67 through which cap screws 63 extend. Each of the retainers 62 also has an inward extending collar 68 which has a cylindrical surface in thrust transmitting contact with the surrounding cylindrical surface of the associated aperture 51. Each of the retainers 62 further has a conical surface 69 at its inner periphery and the retainers 62 are secured to the cage 11 in such positions that the conical retainer surfaces 69, like the conical head surfaces 57, taper radially outward, that is, toward the outside of cage 11. The annular retainers 62 surround the frusto-conical head portions 54, respectively, and the relatively contacting conical surfaces 57 and 69 are complementary to each other. Preferably, the same taper is used for all three heads 54 and for all three retainers 62, all having the same common taper. The three planet pinions 53, which are disposed within the three apertures 51 in the cage 11, are adjusted for coaction with the side gears 33 and 34 so as to radially center the latter relative to the axis of rotation of cage 11. The retainers 62 may be radially adjusted relative to the cage 11 by a variable number of shims 71 which are interposed between each retainer 62 and the underlying annular portion of the cage 11.

From the foregoing description it is apparent that a mounting structure is provided for each planet pinion 53 which bridges the associated aperture 51 in cage 11. Each of the planet pinion mounting structures includes a retainer element 62 releasably secured to the cage 11, and a bearing or head portion 54 formed on the respective pinion 53.

Referring to Fig. 2, the cap screws 63, retainer 62 and pinion 53 of Fig. 1 have been removed to reveal the relative size of the peripheral cage apertures 51 and the side gears 33, 34. It is seen that the side gears and aperture 51 are so proportioned and arranged as to accommodate movement of the side gears 33 and 34 into and out of the cage 11 through the aperture 51. Although each of the apertures 51 is large enough to permit the side gears to be moved therethrough, it is evident that only one of the apertures need be so formed for the purposes of this invention.

Before the side gears 33 and 34 can be removed from the interior of the cage 11, the cap screws 63 attaching the retainers 62 to the cage are unscrewed from cage 11 and the retainers and associated pinions are withdrawn outwardly from the cage. Also the half shafts 38, 39 are withdrawn from the hubs of the bevel gears 33 and 34. The dash dotted lines 72 in Fig. 2 indicate, for instance, the position to which shaft 39 may be withdrawn preparatory to removal of side gear 34 from the cage 11. Before removing side gear 34 the shaft 38 must be withdrawn axially to the left in Figs. 1 and 2. After the shafts have been properly withdrawn the gear 34 may be moved axially inwardly to the position shown by dash dotted lines 73, and thence the side gear 34 may be removed outwardly through the exposed aperture 51 in the cage 11. Side gear 33 may be removed from cage 11 in a like manner.

Referring to Fig. 1, the conical surfaces 57 and 69 cooperate to frictionally resist rotation of the planet pinions 53 and thus resist differential rotation of the shafts 38 and 39. The radial outward thrust transmitted in the direction of axis 58 from the side gears 33, 34 to the planet pinions 53 causes a wedging action to occur between the cooperating conical surfaces 57 and 69, thereby producing the desired friction to resist rotation of the planet pinions. Differentials incorporating this invention may be used in motor vehicles in which it is desirable to have differential action when the vehicle is in nonlinear travel, however, unobstructed differential action is not desired where slippage of one of the traction wheels occurs. The frictional resistance to differentiation afforded by the wedging action between the conical surfaces is not so great as to prevent differential action when the vehicle is steered in a nonlinear course, yet it is great enough to proportion the torque between the half shafts 38, 39 so as to insure driving power to the wheel having good traction when the other driving wheel has little or no traction due to slippery ground conditions, for instance.

Fig. 4 shows an alternative planet pinion mounting structure for rotatably journaling the planet pinions on the cage 11. The planet member 76 shown in Fig. 4 corresponds to the planet pinion 53 in Fig. 1, and the means for mounting planet member 76 includes a disk like head portion 77 of the pinion and an annular retainer or bearing member 78. The head portion 77 includes a disk 77' and a removable ring 79 which is secured to the disk 77' by cap screws 81 extending through drilled holes 82 in ring 79 and threaded into drilled and tapped holes 83 in disk 77'. A pair of relatively converging conical surfaces 84 and 86 are formed on the disk head 77 on an axis 87 coincident with the axis on which the bevel teeth of pinion 76 are formed. A pair of coaxial and relatively converging conical surfaces 88 and 89 are formed on retainer 78 in complementary thrust transmitting relation to conical surfaces 84 and 86, respectively. The conical surfaces 84 and 86 are formed to converge relative to one another in a radially inward direction relative to their common axis. The removable ring 79 permits the pinion 76 together with the disk 77' to be separated from the retainer 78. The double conical surface arrangement stabilizes the pinion so that its axis 87 will not deviate from a right angle relationship with the axis of side gears 33 and 34.

A plurality of shims 90 are interposed between ring 79 and disk 77' and when the conical surfaces 84, 86, 88 and 89 become worn through use one or more of the shims 90 may be removed to compensate for the wear. Thus the ring 79 is adjustably secured to the pinion member 76 so as to permit the establishment and maintenance of a close fit between the cooperating conical surfaces 84, 86, 88 and 89.

In Fig. 5 a further alternative planet pinion mounting structure is shown in which there is provided a two piece retainer or bearing member 93 for a planet member 92. Ring portions 94 and 96 of retainer 93 bear upon each other in the direction of pinion axis 91 and have relatively converging conical surfaces 97 and 98, respectively, in coaxial relation to axis 91. The relative convergence of conical surface 97 formed on ring portion 94 and of conical surface 98 formed on ring portion 96 is radially outward relative to axis 91. The head portion 99 secured to planet pinion 92 has a pair of relatively converging coaxial conical surfaces 101 and 102 formed thereon in complementary relation to conical surfaces 97 and 98, respectively. Thus, the planet pinion 92 is stabilized against movement relative to cage 11, except for rotation on axis 91 which is at right angles to the axis of rotation of cage 11.

A plurality of shims 103 are interposed between ring portions 94 and 96 and by varying the number of shims the proper fit between the cooperating conical bearing surfaces 97, 98, 101 and 102 may be provided. For instance, if the conical surfaces become worn in use one or more shims may be removed to compensate therefor.

The cooperating conical surfaces of the pinion mountings shown in Figs. 4 and 5 serve to proportion the torque to the differential half shafts in a manner similar to that previously described in regard to the pinion mounting shown in Fig. 1.

It will be noted that each of the herein disclosed planetary differentials has a pair of bevel side gears 33 and 34, bevel planet pinions in mesh with the side gears, a cage structure 11 and separable mounting means associated with the side gears, bevel pinions and cage structure 11 for operatively positioning the side gears and planet pinions within the cage structure, these mounting means including a head portion non-rotatably connected with one of the planet pinions, and a retainer rotatably and releasably securing the head portion within a peripheral aperture of the cage structure 11. In each of the illustrated embodiments of the invention the side gears 33 and 34 and a peripheral cage aperture are so proportioned and arranged as to accommodate movement of the side gears 33 and 34 into and out of the cage structure 11 through said aperture, the latter being bridged by the planet pinion mounting structure.

The provision of a peripheral aperture in the cage structure large enough to pass side gears 33 and 34 therethrough permits the cage 11 to be formed in one piece, as by casting. The use of three planet pinions is desirable to balance the loads on the bevel teeth of the side gears 33 and 34 and planet pinions; also the use of three planet pinions is desirable to floatingly position the side gears 33 and 34 radially in relation to the axis of rotation of the cage 11.

The differentials hereinbefore described permit the bevel pinions, side gears and thrust washers to be removed for repair or replacement without removing the cage from its support and this feature results in a saving of time and labor cost.

Also, by providing shims 71 between the retainers and cage structure 11, it is possible to adjust the position of the pinions so that they center the side gears radially relative to the axis of rotation of the cage. By providing radial clearance between the side gear hub portions 42 and 44 and cage bores 31 and 32, respectively, the loads on the teeth of the side gears and pinions will be substantially balanced. Further, the radial thrust from the side gears to the pinions will be equally distributed to the three pinions and this is particularly desirable in torque proportioning differentials of the type herein disclosed, in that the frictional resistances afforded by the three pinion mounting structures are permitted to be simultaneously effective.

It should be understood that it is not intended to limit the invention to the herein disclosed details of construction and that the invention may be embodied in such other forms and modifications as are embraced by the scope of the appended claims.

It is claimed and desired to secure by Letters Patent:

1. In a bevel gear differential, the combination of a pair of bevel side gears, bevel planet pinions in mesh with said side gears, a rotary cage structure, and means including a planet pinion supporting structure bridging a peripheral aperture in said cage structure and detachably secured to the latter for operatively mounting one of said planet pinions on said cage structure, said side gears and aperture being so proportioned and arranged as to accommodate movement of said side gears into and out of said cage structure through said aperture.

2. In a bevel gear differential, the combination of a pair of bevel side gears; bevel planet pinions in mesh with said side gears; a cage structure; and planet pinion mounting structures bridging peripheral apertures, respectively, in said cage structure and operatively mounting said planet pinions on said cage structure, one of said planet pinion mounting structures including a retainer element releasably secured to said cage structure and a bearing portion formed on said planet pinion, said retainer element and bearing portion cooperating with each other to position said planet pinion within said aperture, and said side gears and aperture being so proportioned and arranged as to accommodate movement of said side gears into and out of said cage structure through said aperture.

3. A differential as set forth in claim 2 in which there are at least three planet pinions equally spaced circumferentially about the axis of said side gears.

4. A differential as set forth in claim 3 in which said side gears are radially positioned by said planet pinions.

5. In a bevel gear differential, the combination of a pair of bevel side gears; bevel planet pinions in mesh with said side gears; a rotary cage structure; and separable mounting means associated with said side gears, bevel pinions and cage structure for operatively positioning said side gears and planet pinions within said cage structure, said mounting means including a head portion non-rotatably connected with one of said planet pinions, and a retainer rotatably and releasably securing said head portion within a peripheral aperture of said cage structure; said side gears and aperture being so proportioned and arranged as to accommodate movement of said side gears into and out of said cage structure through said aperture.

6. In a bevel gear differential, the combination of a pair of bevel side gears; bevel planet pinions in mesh with said side gears; a rotary cage structure; separable mounting means associated with said side gears, bevel pinions and cage structure for operatively positioning said side gears and planet pinions within said cage structure, said mounting means including a conical head portion non-rotatably secured in coaxial relation to one of said planet pinions and having a first conical thrust transmitting surface in radially outward tapering relation to said cage structure and an annular retainer element for said head portion releasably secured to said cage structure and presenting a second conical thrust transmitting surface in complementary thrust transmitting relation to said first thrust transmitting surface, said one planet pinion being rotatably disposed within a peripheral aperture of said cage structure and said side gears and aperture being so proportioned and arranged as to accommodate movement of said side gears into and out of said cage structure through said aperture.

7. In a bevel gear differential, the combination of a pair of bevel side gears, bevel planet pinions in mesh with said side gears, a rotary cage structure, and separable mounting means associated with said side gears, bevel pinions and cage structure for operatively positioning said side gears and planet pinions within said cage structure, said mounting means including a head portion nonrotatably secured to one of said planet pinions and presenting a first pair of relatively converging conical thrust transmitting surfaces in coaxial relation to said one planet pinion, and an annular retainer for said head portion releasably secured to said cage structure and presenting a second pair of relatively converging coaxial conical thrust transmitting surfaces in complementary thrust transmitting relation to said first pair of thrust transmitting surfaces, said one planet pinion being rotatably disposed within a peripheral aperture of said cage structure and said side gears and aperture being so proportioned and arranged as to accommodate movement of said side gears into and out of said cage structure through said aperture.

8. In a bevel gear differential, the combination of a pair of bevel side gears, bevel planet pinions in mesh with said side gears, a rotary cage structure, and separable mounting means associated with said side gears, bevel pinions and cage structure for operatively positioning said side gears and planet pinions within said cage structure, said mounting means including a head portion non-rotatably secured to one of said planet pinions and presenting a first pair of relatively convering conical thrust transmitting surfaces in coaxial relation to said one planet pinion, and an annular retainer for said head portion releasably secured to said cage structure and presenting a second pair of coaxial and relatively converging conical thrust transmitting surfaces disposed in complementary thrust transmitting relation to said first pair of thrust transmitting surfaces and converging radially outward relative to their common axis, said one planet pinion being rotatably disposed within a peripheral aperture of said cage structure and said side gears and aperture being so proportioned and arranged as to accommodate movement of said side gears into and out of said cage structure through said aperture.

9. In a bevel gear differential, the combination of a pair of bevel side gears, bevel planet pinions in mesh with said side gears, a rotary cage structure, and separable mounting means associated with said side gears, planet pinions and cage structure for operatively positioning said side gears and planet pinions within said cage structure, said mounting means including a head portion nonrotatably secured to one of said planet pinions and presenting a first pair of relatively converging conical thrust transmitting surfaces in coaxial relation to said one planet pinion, and an annular retainer for said head portion releasably secured to said cage structure and presenting a second pair of coaxial and relatively converging conical thrust transmitting surfaces disposed in complementary thrust transmitting relation to said first pair of thrust transmitting surfaces and converging radially inward relative to their common axis, said one planet pinion being rotatably disposed within a peripheral aperture of said cage structure and said side gears and aperture being so proportioned and arranged as to accommodate movement of said side gears into and out of said cage structure through said aperture.

10. In a bevel gear differential the combination of a rotary cage presenting a peripheral aperture; a pair of bevel side gears; a planet member having a bevel pinion and a disk head rigidly connected with said bevel pinion at the wide end of the latter, said bevel pinion meshing with said side gears and said disk head being diametrically larger than said pinion and having a pair of relatively converging conical thrust transmitting surfaces in coaxial relation to said pinion; a bearing member nonrotatably and detachably secured to said cage in rimming relation to said aperture and presenting a pair of conical bearing surfaces disposed in complementary load transmitting and frictional engaging relation to said thrust transmitting surfaces, respectively; one of said planet and bearing members having a ring detachably and nonrotatably secured thereto and presenting one of said conical surfaces; said planet and bearing members being separable from one another upon detachment of said ring from said one of said members.

11. A differential as set forth in claim 10 in which said conical thrust transmitting surfaces converge radially inward relative to the axis of said pinion.

12. A differential as set forth in claim 10 in which said conical thrust transmitting surfaces converge radially outward relative to the axis of said pinion.

References Cited in the file of this patent

UNITED STATES PATENTS

| | | |
|---|---|---|
| 1,446,545 | Brush | Feb. 27, 1923 |
| 1,620,246 | Walter | Mar. 8, 1927 |
| 2,019,464 | Riblet | Oct. 29, 1935 |
| 2,037,206 | Bodin | Apr. 14, 1936 |
| 2,415,293 | LeTourneau | Feb. 4, 1947 |
| 2,569,533 | Morgan | Oct. 2, 1951 |